US006155190A

United States Patent [19]
Cavanagh

[11] Patent Number: 6,155,190
[45] Date of Patent: Dec. 5, 2000

[54] AIR CUSHION DRY DOCK TRANSPORT SYSTEM

[75] Inventor: Richard A. Cavanagh, Panama City, Fla.

[73] Assignee: The United States of America as represented by the Secretary of the Navy, Washington, D.C.

[21] Appl. No.: 09/337,206

[22] Filed: Jun. 1, 1999

[51] Int. Cl.[7] .............................. B63C 1/02; B63C 11/16
[52] U.S. Cl. ................................... 114/45; 405/1
[58] Field of Search .................................. 114/258, 259, 114/44, 45, 49, 50; 180/116, 127, 117, 129; 405/1, 2, 3, 4

[56] References Cited

U.S. PATENT DOCUMENTS

| | | | |
|---|---|---|---|
| 3,465,533 | 9/1969 | Payne | 61/67 |
| 3,468,393 | 9/1969 | Harrison | 180/116 |
| 3,736,898 | 6/1973 | Yamura | 114/45 |
| 4,510,877 | 4/1985 | Bloxham | 114/45 |
| 5,927,222 | 7/1999 | Eakin et al. | 114/45 |

*Primary Examiner*—S. Joseph Morano
*Assistant Examiner*—Patrick Craig Muldoon
*Attorney, Agent, or Firm*—Harvey A. Gilbert; Donald G. Peck

[57] ABSTRACT

A transport system includes a dry dock mounted on an air cushion platform to portage a ship overland. The system raises the ship from one body of water, hauls it across different surfaces, and launches it in another body of water. Ships and other water borne vessels can be portaged on air cushions across land, marsh, bog, or other impediments to navigable waters, or barge-like work platforms can be taken to work sites on water, swamps or tundra and retrieved after completion of the task. Transport system and ships can bypass canals and locks if these become inoperable, or the canals and locks can be circumvented if political conflicts deny their access.

3 Claims, 3 Drawing Sheets

6,155,190

AIR CUSHION DRY DOCK TRANSPORT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to systems for transporting loads. More particularly, this invention relates to a system for portaging ships.

Ships and waterborne vessels serve purposes that aircraft and land vehicles cannot match. Moving ships, barges, and many other water borne vessels from one body of water to another or into a body of water is a daunting undertaking. Their great weight and bulk prevent most of them from being portaged. Only a few smaller landing craft may be portaged and these usually are lifted from the water by a crane, loaded on trucks or railroad cars, hauled to the next body of water, and placed in the water by a crane. Large ships and smaller craft require that the goods must be off loaded, hauled overland, and reloaded. This is time-consuming and uneconomical. In addition, the large ships also must have a second ship to load, if it is available.

Systems of canals and locks have been used to get across isthmuses or circumvent some land obstacles between navigable waters; however, these systems are few and far between, and often they may not be where they are needed. Building new canals takes too much time and is expensive. All such waterways are vulnerable to sabotage or other deliberate subversion, and conflicting politics may deny access to them when it is most needed. Consequently, water borne vessels may not be able to be where they are needed to complete a mission or task.

Thus, in accordance with this inventive concept, a need has been recognized in the state of the art for a system for portaging ships and other water borne vessels on air cushion platforms across land, marsh, bog, or other impediment, to navigable waters.

SUMMARY OF THE INVENTION

The present invention provides a transport system that portages a ship overland on a dry dock mounted on an air cushion platform. The system raises the ship from water, hauls it across other surfaces, and launches it in water.

An object of the invention is to provide a cost-effective alternative to canals.

Another object of the invention is to provide a system for transporting loads overland.

An object of the invention is to provide a system for portaging ships from one body of water to another.

Another object of the invention is to provide a system for portaging ships on an air cushion platform.

Another object of the invention is to provide a system for raising a ship from one body of water, hauling it overland, and launching it in another body of water.

Another object of the invention is to provide a system for raising a ship from one body of water, hauling it overland, and launching it in another body of water without incurring excessive costs to build a roadway or creating permanent damage to the environment.

Another object of the invention is to provide a system utilizing a dry dock on an air cushion platform that is self propelled or towed to and from work sites on water, ice, swamps, tundra, or land.

Another object of the invention is to provide a system utilizing a dry dock on an air cushion vehicle to transport ships over or through ice packs to reach clear water.

Another object of the invention is to provide a system for transporting work and crane barges into swamp, tundra, and other areas that are not accessible by land vehicles or water vessels.

Another object of the invention is to provide a system for transporting barges and ships away from shore regions to land areas for off loading goods.

Another object of the invention is to provide a system made from proven constituent parts to transport ships and goods that eliminates reliance on cranes, railroads, and canals.

These and other objects of the invention will become more readily apparent from the ensuing specification when taken in conjunction with the appended claims.

DESCRIPTION OF THE PREFERRED EMBODIMENT

Figure 1:
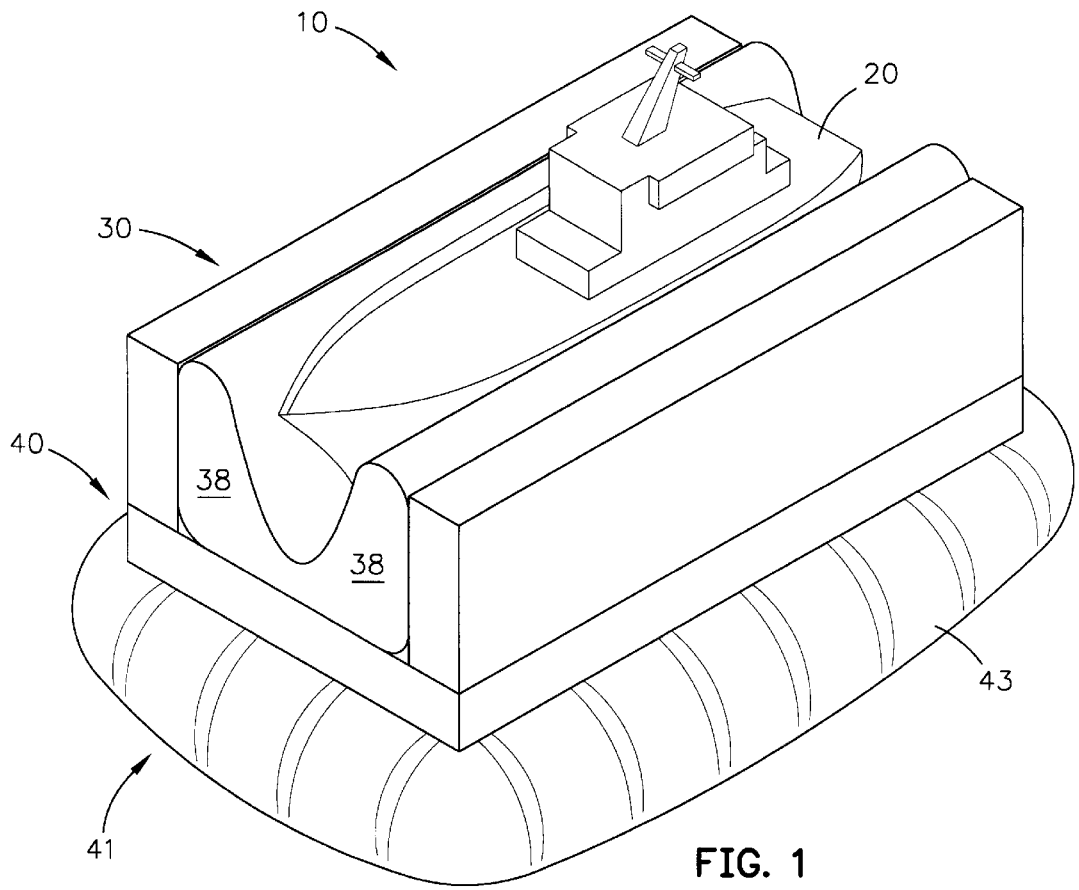
FIG. 1 isometrically shows the transporter system of this invention hauling a ship overland.

Referring now to FIG. 1, transport system 10 cradles ship 20, or other water borne vessel on air bag structure 38 to carry it across water and other surfaces, such as those on ice, swamps, tundra, or land. System 10 includes dry dock portion 30 that raises ship 20 above the water and air cushion platform portion 40 that generates air cushion 41 in skirt 43 to support and carry ship 20, dry dock portion 30, and air cushion platform portion 40. Air cushion platform 40 rides on air cushion 41 in accordance with established principles of well-known designs that lift heavy loads and rapidly traverse water and land.

Figure 2:
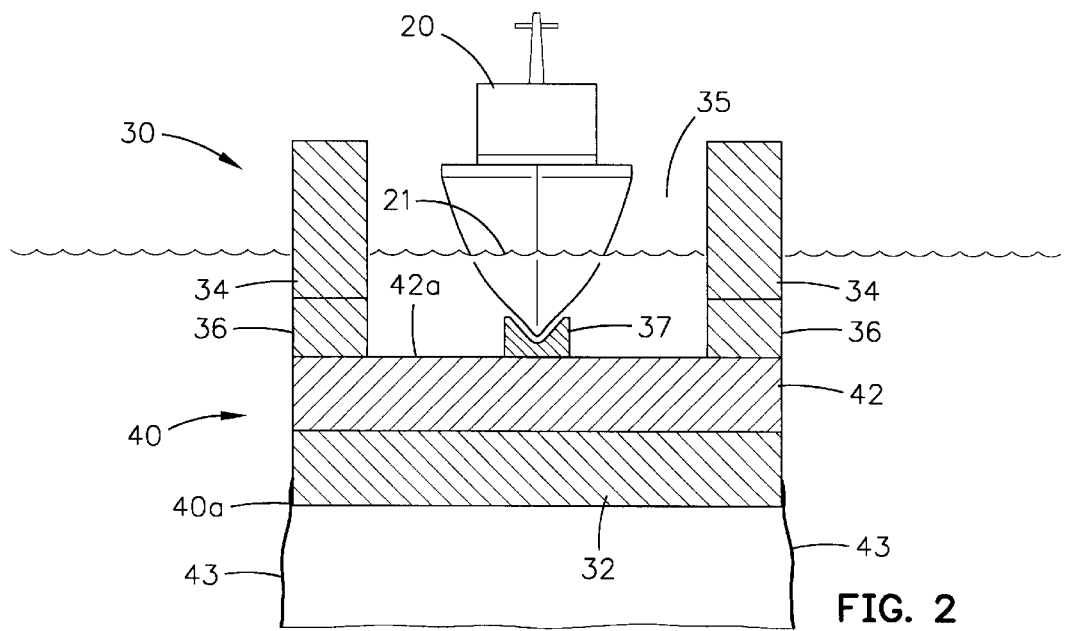
FIG. 2 is cross-sectional view of the transporter system receiving a ship in the dry dock.

Referring to FIG. 2, dry dock 30 is provided with ballast tanks 32 that are selectively flooded and purged to submerge and raise at least part of dry dock 30. Equipment for generating air cushion 41 may be located in upper part 42 of air cushion platform 40 which is located at and beneath deck 42a. This equipment is protected from the effects of exposure to seawater and may be activated when upper part 42 is above the surface of the water. Thus, ambient air may be drawn in through suitable openings above deck 42a to generate and duct volumes of pressurized air through passageways, or air shafts (not shown) that bypass ballast tanks 32 for air cushion 41.

Rigid wall portions 34 each upwardly extend from opposite sides of dry dock 30 along its length. Rigid wall portions 34 are on opposite sides of bay 35 which has openings at its opposite ends to permit ship 20 to enter and leave dry dock 30 from either end. Wall portions 34 have ballast tanks 36 that may be selectively flooded and purged to help submerge and raise dry dock 30. Wall portions 34 may also house machinery of air cushion platform 40 for generation of additional volumes of pressurized air which are fed through air ducts to air cushion 41. Optionally, another wall could extend between walls 34 to close off one of the openings at one of the ends. The additional wall could house more ballast tanks and equipment.

The required volumes and pressures of air to lift and transport system 10 and ship 20 can be developed by several different types of known onboard equipments and machinery. For examples, the wash of propeller fans, or the exhausts of turbojets, turbofans, or similar engines can be used to generate the volumes and pressures of air in the air cushions. This can be augmented by scooping dynamic air as transport system 10 moves forward. The dynamic air is slowed and converted from dynamic pressure to static pressure for additional lift.

Dry dock 30 may have rigid keel guide 37 to guide and stabilize ship 20 as it enters and leaves bay 35. Keel guide 37 may also help support ship 20 while it is in bay 35, but such support is primarily provided by air bag structure 38. Air bag structure 38 extends along opposite lateral sides of ship 20 in bay 35 and supports and secures ship 20 in dry dock 30 while it is being raised from the water and while it is in transit, see FIG. 3.

Air bag structure 38 may include a single flexible air bag or several smaller bags that collectively provide support for ship 20; structure 38 is coupled to a suitable source of pressurized air which may include some of the equipment and machinery of air cushion platform 40 that couples volumes of pressurized air to air cushion 41. Air bag structure 38 may be arranged to assure that sufficient quantities of air can be drawn in and delivered to the equipment and machinery to inflate structure 38 and generate air cushion 41 and may have passageways, or air shafts (not shown) to assure availability of such quantities.

Figure 3:
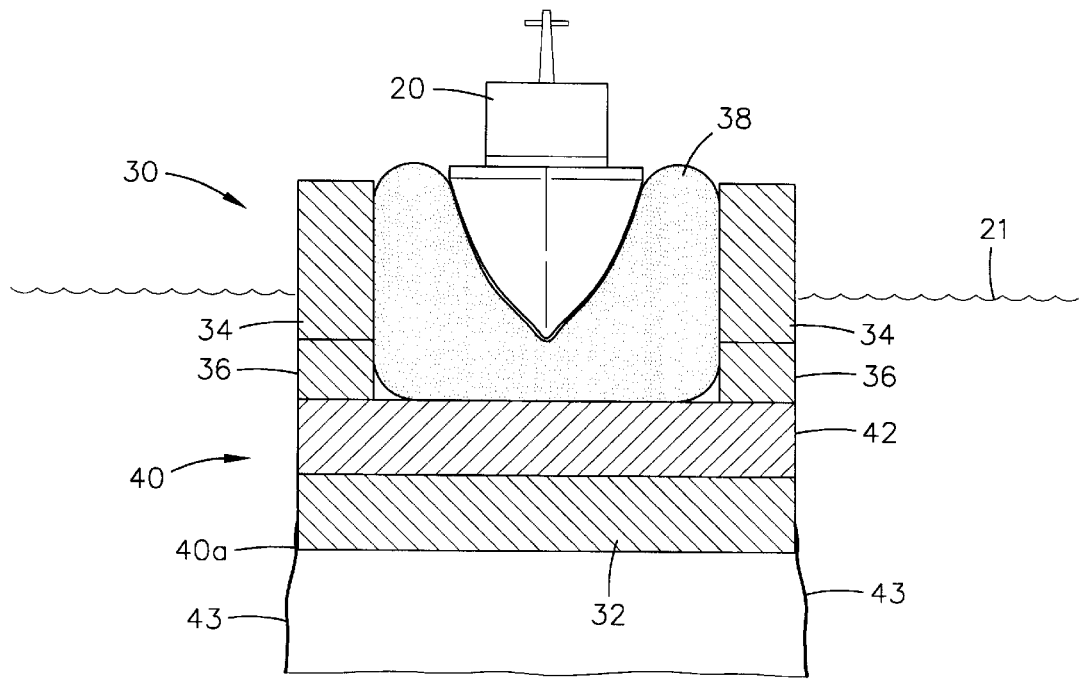
FIG. 3 is an end view of the transporter system supporting the ship on inflated air bag structure in the dry dock.

By way of example, if ship 20 had a beam of 92 feet and length of 750 feet at waterline 21 and a gross tonnage of about 30,600 tons, air pressure in air bag structure 38 would be less than 1,100 pounds per square foot (7.7 pounds per square inch) to support and hold ship 20 in an upright orientation in bay 35 of dry dock 30, as shown in FIG. 3.

Supporting ship 20 by pressurized air bag structure 38, distributes the structural loads as they are distributed in the water, and ship 20 is held securely. In addition, air bag structure 38 eliminates the need for maintaining an inventory of specific shoring to fit the geometries of different ships since structure 38 accommodates a broad class of vessels. This feature further reduces the costs of dry-docking ship 20 and the times required to secure it or differently-shaped barge-like work platforms.

Air cushion platform 40 includes skirt 43 and the equipment and machinery for generation of sufficient volumes of pressurized air which were placed in upper part 42 and rigid walls 34 to keep them out of the water. Skirt 43 depends from the periphery 40a of air cushion platform 40 to generate and define air cushion 41. Skirt 43 may be made up from panels, or a multitude of fingers or pericells that have appropriate flexible, semi-flexible, or pliable properties that cooperate to further assure generation and definition of air cushion 41. Skirt 43 is in an uninflated, or unpressurized condition in FIGS. 2 and 3 and hangs from platform 40 as ship 20 enters bay 34 and air bag structure 38 is pressurized to support ship 20.

Figure 4:
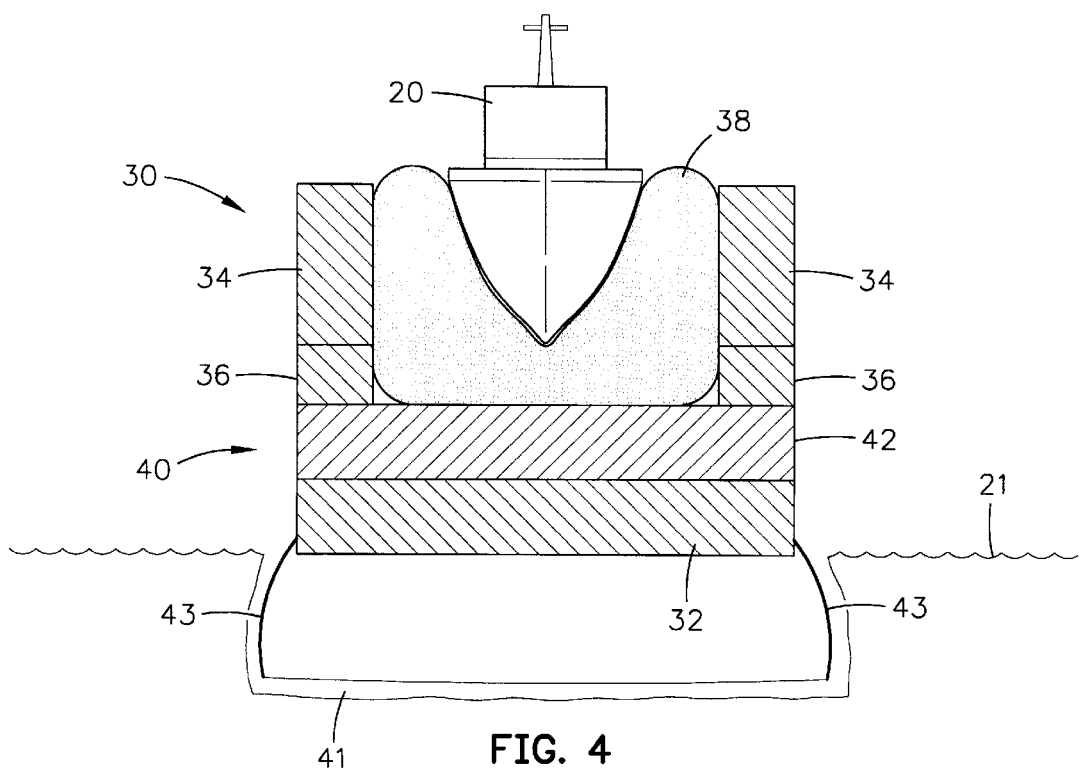
FIG. 4 is an end view of the transporter system having the air cushion inflated to raise the ship above the waterline.

Referring to FIG. 4, skirt 42 is shown inflated with volumes of pressurized air distending it to fully form air cushion 41. Air cushion 41 lifts and supports the heavy loads of ship 20 and transport system 10 at the surface of the water by distributing these loads across the wide area spanned by air cushion platform 40. The shape of air cushion 41 is maintained by supplying volumes of pressurized air within ranges of relatively low air pressure. Sufficient volumes of pressurized gases are supplied to compensate for portions of these volumes that spill out around the sides of skirt 43 during support of the heavy loads and transit of system 10 across a variety of surfaces. If the same exemplary ship 20 referred to above were being transported on transport system 10 (that includes dry dock 30 and air cushion platform 40), the gross weight would be about 38,250 tons. If the dimensions of air cushion platform 40 were measured to be 125 feet wide by 800 feet long, air cushion 41 would have a pressure of 765 pounds per square foot (5.3 pounds per square inch) to raise the total weight of ship 20 and transport system 10.

Generation of sufficient volumes of pressurized air at such air pressures can be done by equipment and machinery in dry dock 30 and air cushion platform 40 so that ship 20 can be lifted, relocated and launched, and transport system 10 can be returned to its point of departure for use at a later time. The onboard equipment and machinery may adjust the volumes and pressures of air based on different total weights caused by different loads and differently sized vehicles.

Figure 5:
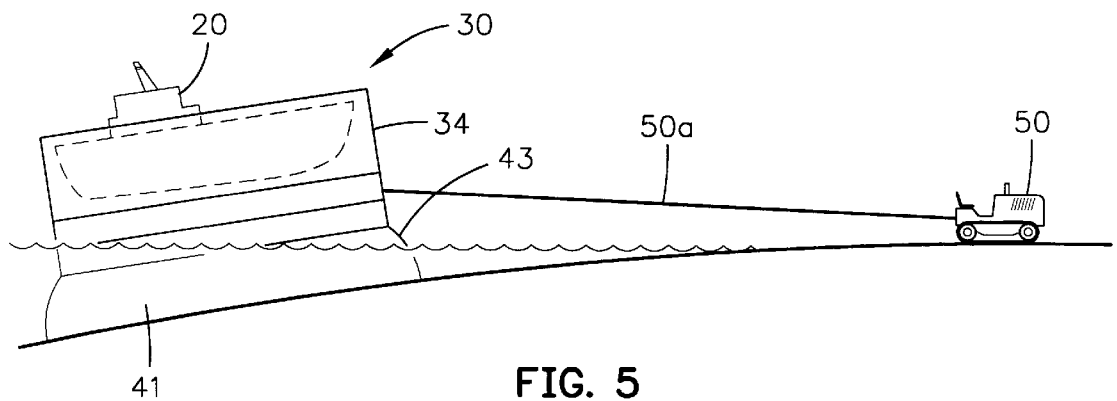
FIG. 5 is a side view of air cushion platform carrying ship and dry dock out of water onto the beach and being helped by a tow vehicle.

Once the combined load of transport system 10 and ship 20 is supported by air cushion 41, the same or auxiliary equipment and machinery including propeller fans, turbojets, turbofans, or similar engines also can be used to propel and brake air cushion platform 40 as currently done by other ground effect vehicles. Additionally, other expedients for forward propulsion could be connected to platform 40, such as attaching cable 50a to tow vehicle 50, see FIG. 5. Other external towing or pushing systems similar to those used to tow barges on canals might be used to aid the thrust of air cushion platform 40. Thus, transport system 10 and ship 20 can go across a terrain feature or other obstacle which might otherwise block off a body of navigable water. The other propulsion equipments and systems referred to above which are external to transport system may be preferable to avoid unnecessary complications of system 10.

Figure 6:
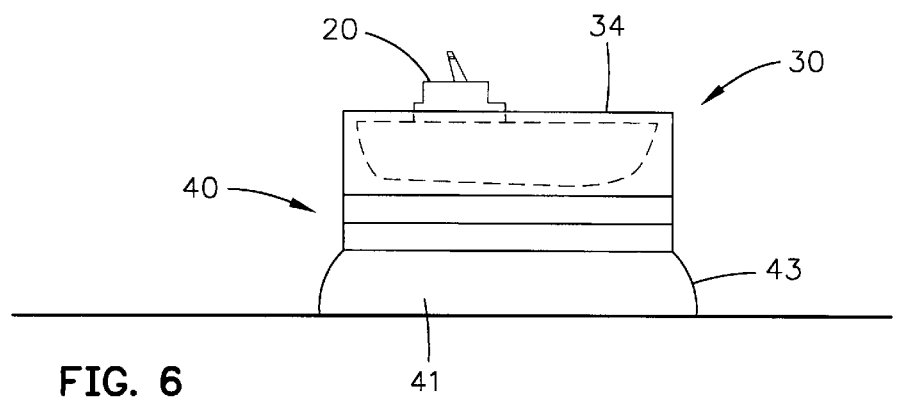
FIG. 6 shows the transporter system carrying the ship across land, ice, swamp, tundra or other surfaces.

Referring to FIG. 6, transport system 10 progresses overland or other surfaces toward its destination, i.e. the other body of navigable water. Air cushion platform 40 proceeds from a beach onto the water, see FIGS. 5 and 4, and the pressurized air for air cushion 41 is shut off. Air cushion platform 40 settles into the water and ballast tanks 32 and 36 of dry dock 20 are partially flooded to partially submerge dry dock 30 to the extent shown in FIG. 3. Air is purged from air bag structure 38, and ship 20 is free to float or move out of dry dock 30 as shown in FIG. 2. After ship 20 is gone, this procedure is reversed to recover transport system 10 for reuse.

If transport system 10 were being used to haul a barge-like work platform to a work site on the water or on the surface of a swamp or tundra area, the pressurized air for air cushion 41 is shut off when system 10 arrives at the work site. Air cushion platform 40, dry dock 30, and the work platform settle to rest on the surface of the water, swamp, or tundra. Ballast tanks 32 and 36 are kept dry to provide buoyancy and support for the work platform until the task is completed. When the task is completed, air cushion 41 is once again inflated to raise and support transport system 10 and the work platform so they can be moved for use elsewhere.

Transport system 10 can transit land without the need for canals. If strategic canals are damaged or destroyed, transport system 10 can transit ships and heavy loads overland around the canals. Transport system 10 is a low cost alternative to canals since the costs to develop transport system 10 may be less than the costs to repair damage to existing canals or to build new ones.

Furthermore, transport system 10 reduces the cost to transport loads borne by ships over terrain. That is, a temporary hoverway could be cleared for a single transit. After transit, the surface is either restored to its natural or previous condition, or left as is. Thus, ships could be transported to an inland body of water and left there, and the terrain could be left to recover in a short time from this single transit.

Transport system 10 can transport barges or other vessels inland for off loading, as opposed to stopping at the shore to discharge their supplies. This could be advantageous in areas where oil fields lie inland in swamps or tundra or where an exposed onshore location might be vulnerable to hostile action. In addition, transporter 10 can transport ships over or through ice packs to reach clear water. Transporter system 10 could either break the ice without damage, or, simply could transit over extremely thick ice.

Having the teachings of this invention in mind, modifications and alternate embodiments of this invention may be adapted. For example, special consideration may have to be provided to make transport system 10 compatible with hostile environments, such as those found on the tundra or in polar regions. These special considerations may include, but are not limited to survival and other environmental protections that might include, means to de-ice and free the system from being frozen in place. Accordingly, appropriate subsystems would be included to keep transport system 10 operational for the tasks at hand without departing from this invention.

The disclosed components and their arrangements as disclosed herein all contribute to the novel features of this invention. This invention provides cost-effective and quickly built means to rapidly transport ships and other water vessels to and from navigable bodies of water and barge-like work platforms to otherwise inaccessible work sites. Therefore, transport system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. An apparatus for portaging a ship:
   a dry dock disposed at the surface of the water to raise a ship above said surface and to lower said ship below said surface;
   an air cushion platform connected to said dry dock to carry said ship, said dry dock, and said air cushion platform on an air cushion across said surface and other surfaces including land, ice, swamp, and tundra;
   equipment on said dry dock to generate and duct volumes of pressurized air to generate said air cushion;
   air bag structure on said dry dock to hold said ship in an upright position thereon;
   means on said dry dock for ballasting to raise said ship from the water after purging water therefrom and to launch said ship in the water after flooding water therein, said ballasting means being disposed to laterally extend across said dry dock beneath said ship and on opposite lateral sides of said dry dock;
   means connected to a cable for hauling said ship, dry dock, and air cushion platform across said surfaces; and
   a skirt depending from said air cushion platform around a lower periphery thereof, said skirt having a plurality of flexible and pliable fingers to assure generation and definition of said air cushion.

2. A transport system comprising:
   a dry dock;
   an air cushion platform, said dry dock being mounted on said air cushion platform to portage a ship overland;
   an air cushion generated by said air cushion platform to support and carry said dry dock, said air cushion platform, and said ship,
   air bag structure mounted on said dry dock to hold said ship in an upright position on said dry dock;
   ballast tanks in said dry dock to raise said ship from the water after purging water therefrom and to launch said ship in the water after flooding water therein, said dry dock and air cushion platform raising said ship from water, hauling it across surfaces including water, land, ice, swamp, and tundra, and launching it in water, said ballasting tanks being disposed to laterally extend across said dry dock beneath said ship and on opposite lateral sides of said dry dock;
   a skirt depending from said air cushion platform around a lower periphery thereof, said skirt having a plurality of flexible and pliable fingers to assure generation and definition of said air cushion; and
   a tow vehicle connected to a cable to haul said ship, dry dock, and air cushion platform across said surfaces.

3. A method of portaging a ship comprising the steps of:
   raising a ship above the surface of water on a dry dock, said step of raising including the step of purging water from ballast tanks in said dry dock, said ballast tanks being disposed to laterally extend across said dry dock beneath said ship and on opposite lateral sides of said dry dock;
   pressurizing air bag structure on said dry dock to hold said ship upright on said dry dock;
   providing a skirt depending from an air cushion platform around a lower periphery thereof to include a plurality of flexible and pliable fingers to assure generation and definition of an air cushion;
   supporting said ship, said dry dock, and said air cushion platform on said air cushion, said step of supporting including the steps of generating volumes of pressurized air, feeding said volumes of pressurized air to inside said skirt peripherally disposed on said air cushion platform, and creating said air cushion;
   transporting said ship, said dry dock, and said air cushion platform across surfaces including water, land, ice, swamp, and tundra on said air cushion, said step of transporting includes the step of venting portions of said volumes of pressurized air from said air cushion platform to propel and steer said air cushion platform; and
   launching said ship into water from said dry dock and said air cushion platform, said step of launching includes the step of flowing water into said ballast tanks in said dry dock to lower said dry dock and said air cushion vehicle in the water.

\* \* \* \* \*